UNITED STATES PATENT OFFICE.

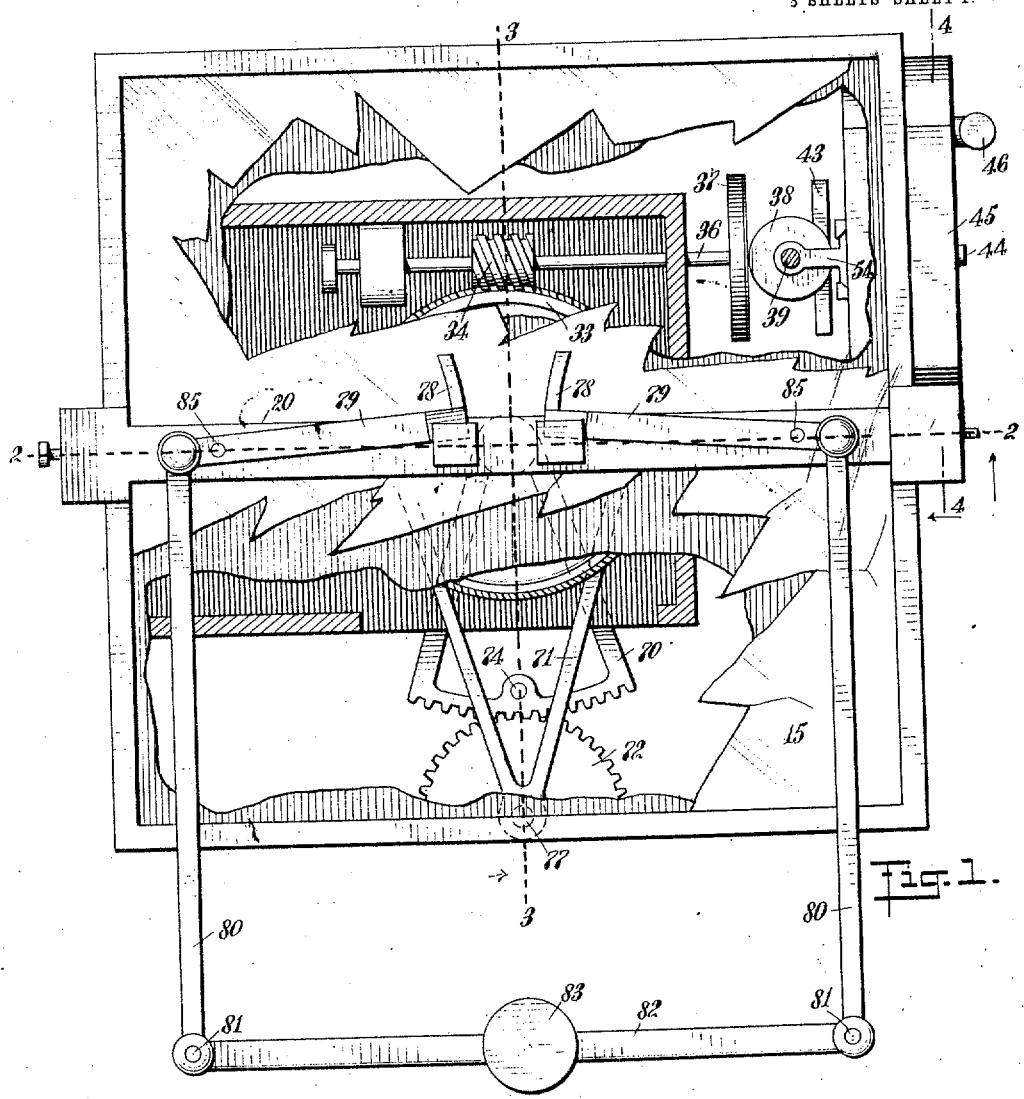
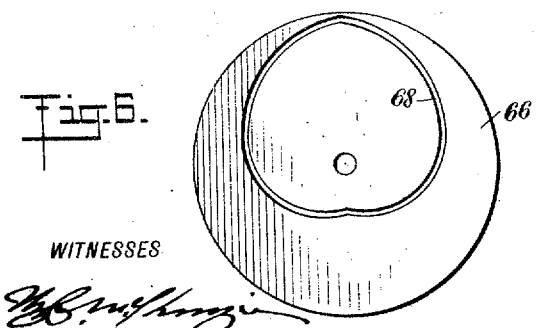
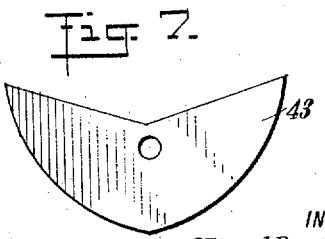

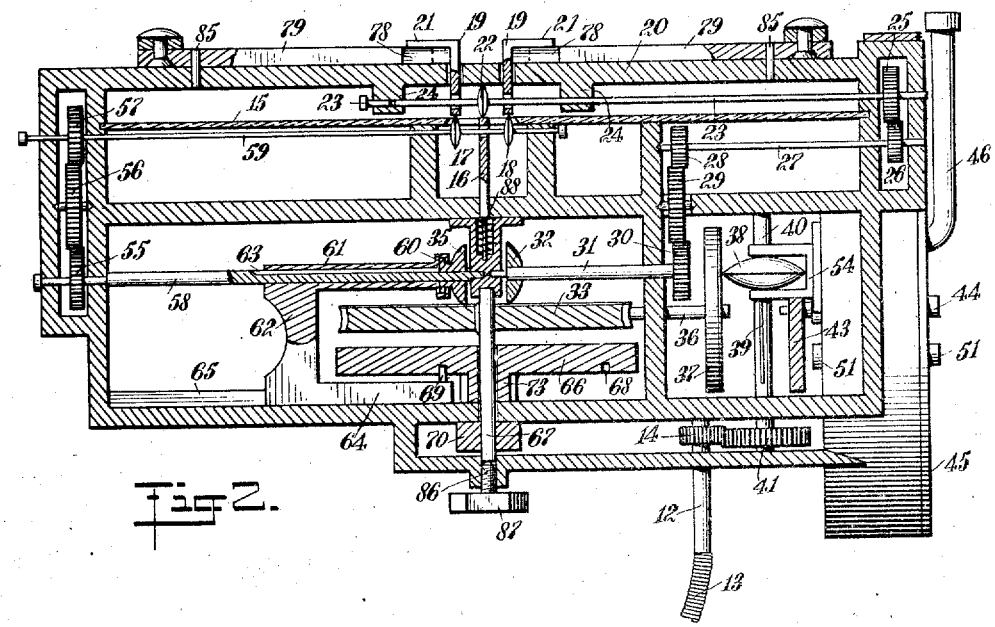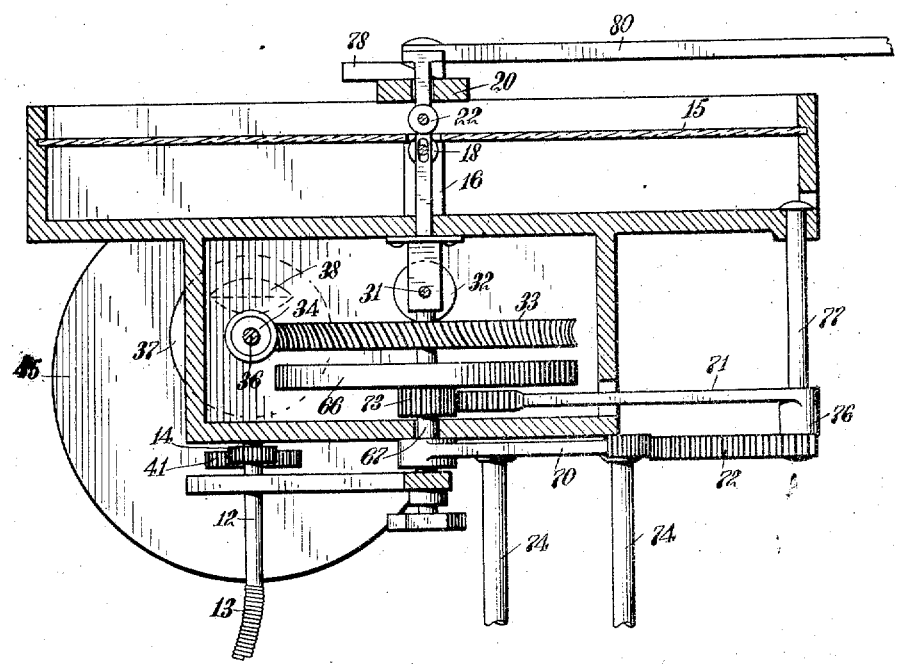

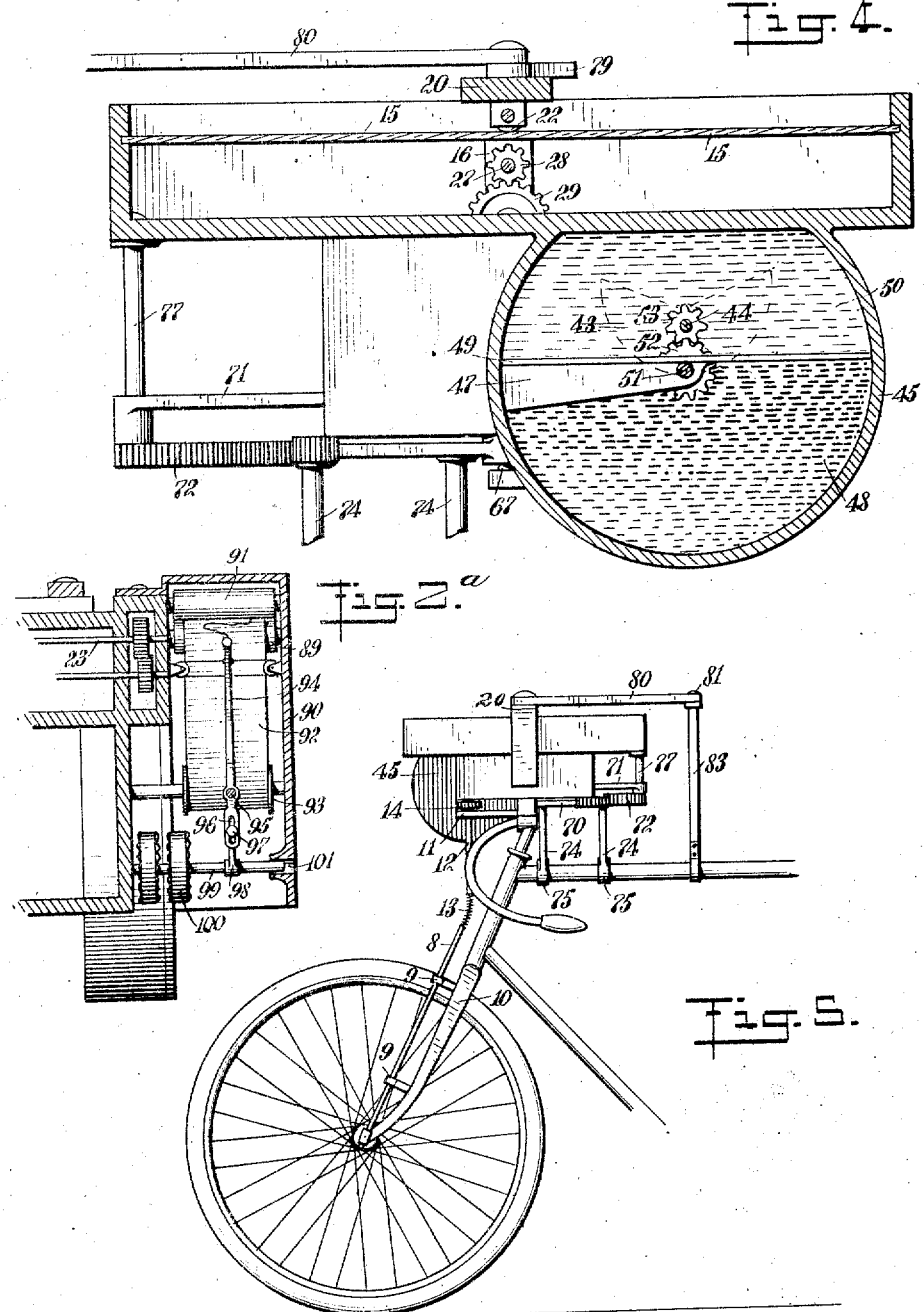

MIGUEL BUSTAMANTE (H), OF MEXICO, MEXICO.

AUTOMATIC MAPPING-MACHINE.

986,437.

Specification of Letters Patent. Patented Mar. 14, 1911.

Application filed April 23, 1910. Serial No. 557,293.

*To all whom it may concern:*

Be it known that I, MIGUEL BUSTAMANTE (H), a citizen of the Republic of Mexico, and a resident of Mexico, Mexico, have invented a certain new and useful Automatic Mapping-Machine, of which the following is a full, clear, and exact description.

Among the principal objects which the present invention has in view are: to provide a machine which may be attached to a moving vehicle to automatically plot on a horizontal plane, the path traveled by the vehicle, and the gradients and altitudes of the path so traveled; and to provide a machine of the character above specified which is compact in size and form, and durable and simple in construction.

One embodiment of the present invention is disclosed in the construction illustrated in the accompanying drawings, forming a part of this specification, in which—

Figure 1 is a plan view, partly in section, of the machine, constructed in conformity with the present invention; Fig. 2 is a longitudinal vertical section, taken on the line 2—2 in Fig. 1; Fig. 3 is a cross vertical section taken on the line 3—3 in Fig. 1; Fig. 4 is a longitudinal section enlarged, taken on the line 4—4 in Fig. 1; Fig. 5 is an assembled view of the machine constructed in accordance with the present invention, showing its application to the frame of a bicycle; Fig. 6 is a plan view, viewed from beneath, of the cam-carrying disk employed in the present invention; and Fig. 7 is a face view of the double connecting cam employed in the present invention.

The machine herein illustrated and described may be applied to any character of vehicle. It is illustrated and described as attached to a bicycle, see Fig. 5 of the drawings. Whether used in conjunction with a bicycle, automobile, or other vehicle, upon the hub or axle, if the same turns with the wheel, is fixedly mounted one of a pair of gears, equal or different in the number of teeth carried thereby, as desired. The other gear of the pair mentioned is mounted fixedly at the lower end to a shaft 8. The shaft 8 is suitably mounted in bearings 9, 9, mounted upon one of the arms of the fork 10, of the bicycle. From the head of the pivot post of the fork 10, is extended a bracket plate 11, in the outer end whereof is formed a bearing for the vertical shaft 12. The shafts 12 and 8 are operatively joined by a spiral spring section 13, forming a flexible driving union between the two shafts. At the upper end of the shaft is mounted the gear wheel 14, whereby the machine is primarily operated.

The paper on which the record is made is supported upon the glass table 15. The table 15 is provided with an opening in the center, to permit the presser foot 16 to extend therethrough, flush with the upper surface of the said table. Through the opening in the table 15 from beneath, are also extended the friction disks 17 and 18, the peripheries of which rise to a little above the surface of the table 15, to engage under light pressure, the paper. Resting upon the disks 17, 18, from above, are presser feet, 19, 19, which are extended through the bridge 20 of the casing holding the table 15, and are provided with the overhanging portions 21, 21. The presser foot 16 supports the friction wheel 22. The wheels 17, 18, and 22 are mounted in transverse alinement, and operate to feed the paper upon which the record plotting is imprinted. The wheel 22 is likewise employed as the marker in the operation of imprinting the said record. In the operation of the present machine, the wheel 22 is driven in unison with the traction wheel of the bicycle, and in constant ratio thereto. That is to say, the interposed mechanism between the wheel of the bicycle, the shafts 8 and 12 and the wheel 22, is such as to rotate the wheel 22 slowly or rapidly in exact proportion to the rotation of the wheel of the bicycle. On the other hand, the wheels 17 and 18 are rotated in varying ratio to the rotation of the wheel of the bicycle, thereby resulting in a deflection of the paper record, as hereinafter more fully set forth.

The wheel 22 is mounted fixedly on the shaft 23 which is suitably mounted in bearings formed in the depended brackets 24, 24. Fixedly mounted on the same shaft is a gear wheel 25. The gear wheel 25 is meshed in toothed engagement with the gear wheel 26, which is fixedly mounted upon the shaft 27. The shaft 27 is rotatably mounted in suitable bearings as shown in Fig. 2, and is further provided with a gear wheel 28, fixedly mounted thereon. The gear wheel 28 is meshed with the gear wheel 29. The gear wheel 29 is provided with bearings in the frame of the machine, and is engaged with the gear wheel 30. The gear wheel 30 is fixedly mounted on the shaft 31, at the opposite end of which is fixedly mounted the friction disk 32. The friction disk 32 is held in frictional relation to the disk 33.

The disk 33 is provided with spiral gear teeth to receive a worm gear 34. The disk 33 becomes what may be termed the master gear of the operating mechanism of the present machine, as the relation of the wheels 32 and 35 engaged therewith upon the said wheel 33, produces the variations for which the present machine is designed.

The wheel 32 is held in fixed relation to the disk 33; that is, at the same distance from the pivotal center of the said disk 33. The disk 33 is rotated by the worm 34, which is mounted on the shaft 36, also mounted in the frame of the machine, and provided at the outer end thereof, with a vertically disposed friction disk 37. The friction disk 37 is provided with a suitable friction or engaging face, such as leather, gutta percha, or other suitable material, to engage operatively the edge of the conical disk 38. The disk 38 is slidably mounted on the shaft 40, a feather or key 39 being formed thereon to compel the said disk to rotate with the said shaft 40. The shaft 40 is provided at the lower end with a gear wheel 41, fixedly mounted on the said shaft, and disposed in toothed engagement with the small pinion 14. The pinion 14 is fixedly mounted on the end of the shaft 12.

As above stated, the shafts 8 and 12 are operatively connected to the wheel of the bicycle. As will be herein more fully described, the disk 38 is raised and lowered across the face of the disk 37, varying thereby the ratio of the speed of rotation between the shafts 40 and 36. At some point or position of the disk 38 upon the disk 37, is established the normal ratio between the rotation of the said disk 37 and the wheel of the bicycle.

The topography of the road is indicated upon a plotting instrument attached to that connected with the shaft 59. The feeding device consists in a cylinder 89, which is fixedly mounted upon the shaft 23 and mounted in bearings in a case 90. Above the cylinder 89 is an idler cylinder 91, the function of which is to maintain the record paper 92 firmly upon the cylinder 89 to insure the feed of the said paper by the said cylinder. The paper is fed from a cylinder 93 and gathered upon a similar cylinder, or other suitable collecting attachment. Where the paper 92 passes over the cylinder 89 the stylus of a rocking arm 94 rests upon the paper. The arm 94 is pivotally mounted at 95, and is provided at the lower end and the end removed from the stylus, with a slot 96. Within the slot 96 is extended a pin 97. The pin 97 is fixedly mounted upon a bracket arm 98 fixedly attached to a short shaft 99. The shaft 99 is operatively connected with the aneroid barometer cylinders 100. The shaft 99 is slidably mounted in perforations 101 formed in the side of the case 90.

In its operation the device is influenced by the rise and fall in altitude of the road traversed, the barometer 100 operating to extend and retract, and to move the shaft 99 connected therewith so that the short end of the arm 94 is rocked in sympathy with the pin 97. The deflection of the lower or short end of the arm 94 is multiplied by the upper arm thereof. As the arm 94 is deflected a waving line is impressed upon the paper 92, showing the rise and fall in the path traversed by the bicycle or vehicle carrying the said machine.

It will be understood that the paper strip 92, which is mounted between the cylinders 89 and 91, corresponds in essential particulars to the paper that is fed by the shafts 23 and 59. The two papers form a record from which the engineer makes his map.

The disk 38 is moved across the face of the disk 37, by the double cam 43. The cam 43 is mounted upon the shaft 44, which is extended through bearings in the sides of a cylindrical chamber 45, which chamber is tightly closed, the entrance to which is gained through the feed pipe 46, shown in Figs. 1 and 2 of the drawings. Fixedly mounted on a second shaft 51 within the chamber 45 is a float 47, formed from any suitable material, adapted to float upon the mercury 47, maintained in the said chamber 45. The float 47 is preferably suspended on one side of the shaft 51. The plate 49 is secured to the plate 47 to prevent the jostling or violent shaking of the mercury, in which action to the mercury and the oil would become, in part, mechanically mixed. This action is aided by the introduction of the oil above the plate 47.

The machine is mounted upon the handle bars of the bicycle, so that the chamber 45 extends accurately parallel with the path that the guiding wheel of the bicycle is traveling at all times. The machine is likewise held in parallel relation to the upper bar of the frame of the bicycle. As a consequence of this construction, whenever the bicycle starts on a grade removed from the level, the mercury 48 is instantly affected, floating, in raised or lowered position the float 47, and thereby slightly rotating the shaft 51.

The shaft 51 and the shaft 44 are connected by means of the gears 52 and 53, see Fig. 4 of the drawings. The gears 52 and 53 are formed preferably in the ratio of one to two, that is; twice the number of teeth in the gear 52 to those formed in the gear 53. This ratio between the two wheels produces double the rotation in the shaft 44 to that produced in the shaft 52. As stated, it is upon the shaft 44 that the cam 43 is mounted. Resting upon the straight surface of the cam 43 is the lower arm of the yoke 54, between the arms of which the disk 36 is mounted. As the shaft 44 is rocked in either direction, the cam 43 is rocked to raise or lower the disk 38. As the disk 38 is raised or lowered, the shaft 36 and worm 34 carried thereby are increased or decreased in their rate of rotation, thereby increasing or decreasing the rate of rotation of the disk 33, and the disk 32, and train of gears 30, 29, 28, 26, 25, and disk 22 connected therewith. This variation in the speed of the wheel 22 results in feeding in a given time a larger or smaller proportion of the paper upon which the record is being imprinted, and this in proportion to the distance traveled by the vehicle on which the planchet is carried. The length of the paper on which the tracing is developed equals the horizontal projection of the road, and is equivalent to the combined hypotenuses of the various triangles formed by the inclination of the road from the horizontal. The eccentric 43, as stated, is calculated that the distances from the edge of the disk 38 to the center of the disk 37 are proportioned with the cosine of the angle of inclination of the road.

It is necessary, for the successful operation of the machine, that it should indicate the curvatures of the path traveled by the vehicle. It is for this purpose that the disks 35, 17, and 18 and the gears 55, 56, and 57 interposed between the shafts 58 and 59, carrying the respective disks, are constructed and arranged substantially as shown in Fig. 2 of the drawings. The disk 35 is mounted in a head 60, having an internal annular groove, to receive a flange formed on the back of the said disk 35. The head 60 is constructed on the end of a tubular arm 61, formed integrally with a standard 62, as seen in Fig. 2 of drawings. The arm 61 is perforated to form a bearing for the shaft 58, in which is formed a groove 63, to receive a feather or key formed in the disk 35. This mounting of the disk 35 on the shaft 58 permits the said disk to slide lengthwise thereof, and imparts to the said shaft 58 the rotation of the said disk. The standard 62 is provided with a base 64, slidably mounted in a groove 65, formed in the casing of the machine. The base 64 extends under the disk 66, which is loosely mounted upon the shaft 67, which also forms a bearing for the disk 33, likewise loosely mounted thereon. The disk 66 has cut in the under side thereof, a heart shaped groove 68, disposed eccentrically to the center or bearing of the disk 66. Extended into the groove 68 is a pin 69, set up from the base of the standard 62. The groove 65 is kept thoroughly lubricated to reduce any frictional hesitation of the base 64. As a result of this construction and arrangement, with the rotation of the disk 66, the base 64, standard 62, and disk 35, are carried away from or drawn toward the shaft 67 or pivotal center of the disk 33. The disk 33 being continuously rotated by the mechanism connecting it with the wheels of the vehicle, the disk 35 is constantly rotated thereby, but the rate of rotation of the disk 35 varies as the same is carried to or from the said pivotal center of the said disk 33. The means for rotating the disk 66 will be hereinafter described. The varied rotation of the disk 35 produces a variation in the rotation of the disks 17 and 18.

The variation in the rotation of the disks 17, 18 and 35 is produced by the quadrants 70 and 71, the sector 72 and the pinion 73 being arranged and constructed substantially as shown in Figs. 1 and 3 of the drawings. The quadrant 70 is fixedly mounted on the posts 74, 74, which posts are fixedly mounted, by means of grip collars 75, 75, on the frame of the bicycle, as shown in Fig. 5 of the drawings. The quadrant 70 loosely surrounds the shaft 67, and is held in toothed engagement with the sector 72. The sector 72 is integrally formed with the quadrant 71, the hub 76 connecting the two, as shown in Fig. 3 of the drawings. The quadrant 71 and sector 72 are pivotally mounted on the pivot post 77. The quadrant 71 extends within the casing of the machine, and is meshed in toothed engagement with the pinion 73. The pinion 73 is integrally formed or rigidly secured to the disk 66.

As above stated, the frame of the machine is accurately mounted upon the handle bars of the bicycle or in accurate transverse relation to the guide wheel of any vehicle to which the machine is applied. The body of the vehicle is, in the present instance, the frame of the bicycle, which holds rigidly in line the quadrant 70, therefore, to move the frame of the machine, the sector 72 is compelled to rotate around the fixed quadrant 70, this action compelling the sector to rotate upon its pivot, thereby carrying the quadrant in a similar rotation. The quadrant 71 rotating in connection with the pinion 73, produces a rotation of the said pinion and the disk 66 connected therewith. As above stated, the rotation of the disk 66 produces the action referred to with regard to the disposition of the disks 35 and 17 and 18. In this manner is the disk 35 shifted on the disk 33, to increase or decrease the rate of rotation of the same.

The disks 17 and 18 being laterally disposed equi-distant at each side of the disk 22, the release of the presser foot 19 on either one of the said disks would cause that particular disk to release its hold on the paper being fed, and permit the opposite disk to advance or recede the paper faster or slower than the disk 22, thereby producing by shifting the paper about the disk 22, as a center, a curved path for the marking produced by or in line with the said disk 22. It is in this manner that the curvature is indicated in this machine.

The normal position of the presser feet 19, 19, is that in which the machine carrying the automatic mapping machine is progressing in an accurate straight line. In this position the presser feet 19, 19 are raised from contact with the paper, which is then being fed solely and only by the disk 22. The presser feet 19, 19 are held in this position by the wedges 78, 78. The wedges 78, 78 are formed on the ends of the arms 79, 79. The arms 79, 79 are pivotally connected to the arms 80, 80, which are pivotally connected at 81 to the cross bar 82, as shown in Figs. 1 and 3 of the drawings. The cross bar 82 is held in rigid relation with the body of the vehicle by the post 83, or in the present application to the frame of the bicycle. The arms 79, 79 are pivotally secured to the bridge 20, at 85, 85. By means of this construction and arrangement, it will be seen that as the frame of the machine is rotated about the shaft 67, the arms 79 are oscillated in opposite directions, inserting the one of the said wedges 78 while withdrawing the other from contact with the overhanging portions 21 of the presser foot 19, thereby causing one or the other of the said disks 17 and 18 to engage the paper passing under the disk 22, with frictional grasp. As above stated, this engagement by the one or the other of the disks 17 and 18 causes the paper to be deflected from the straight line and thereby produces a curve in the marking imparted by the disk 22. This curve, as will be seen, throws to the right or to the left according as the guiding wheel of the vehicle is turned, and with it the frame of the machine.

To steady the action of the mercury 48 in the chamber 45 and to prevent splashing of the same, the upper portion of the chamber 45 is completely filled with oil 50, which is introduced through the tube 46. The tube 46 is closed tightly by a suitable cap. This construction and arrangement results in a leveling medium, which does not splash or become disarranged.

The shaft 67 is provided with a screw-threaded section 86 and the thumb nut 87.

The presser foot 16 is guidably mounted in the frame of the machine, and is seated upon a spiral spring 88, whereby a constant pressure is maintained upward under the paper against the disk 22.

While it has not been mentioned before in this description, it will be understood that some approved form of inking device will be attached to the friction wheel 22.

Having thus described my invention, I claim as new and desire to secure by Letters Patent:

1. An automatic mapping machine comprising rotary means for feeding paper under a marking instrument; a transmission mechanism operatively connecting said rotary means and a wheel of the vehicle carrying said machine; rotary members disposed in lateral arrangement with said means for feeding paper to engage the same; selecting means for alternately operating said members; means embodying the steering device of said vehicle for rotating the said members; and means embodying the steering device of said vehicle for varying the speed of said rotary members.

2. An automatic mapping machine comprising rotary means for feeding paper under a marking instrument; a transmission mechanism operatively connecting said rotary means and a wheel of the vehicle carrying said machine; means embodying a leveling device for varying the speed of said rotary means; rotary members disposed in lateral arrangement with said means for feeding paper to engage the same; selecting means for alternately operating said members; and means embodying the steering device of said vehicle for rotating the said members.

3. An automatic mapping machine comprising rotary means for feeding paper under a marking instrument; a transmission mechanism operatively connecting said rotary means and a wheel of the vehicle carrying said machine; means embodying a leveling device for varying the speed of said rotary means; rotary members disposed in lateral arrangement with said means for feeding paper to engage the same; selecting means for alternately operating said members; means embodying the steering device of said vehicle for rotating the said members; and means embodying the steering device of said vehicle for varying the speed of said rotary members.

4. An automatic mapping machine comprising rotary means for feeding paper under a marking instrument; a transmission mechanism operatively connecting said rotary means and a wheel of the vehicle carrying said machine; rotary members disposed in lateral arrangement with said means for feeding the paper to engage the same; selecting means for alternately operating said members; means embodying the steering device of said vehicle for rotating the said members; and means embodying a leveling device for equally varying the speeds of both the said feeding and guiding means and members.

5. An automatic mapping machine comprising rotary means for feeding paper under a marking instrument; a transmission mechanism operatively connecting said rotary means and a wheel of the vehicle carrying said machine; rotary members disposed in lateral arrangement with said means for feeding the paper to engage the same; selecting means for alternately operating said members; means embodying the steering device of said vehicle for rotating the said members; means embodying the steering device of said vehicle for varying the speed of said rotary members; and means embodying a leveling device for equally varying the speeds of both the said feeding and guiding means and members.

6. An automatic mapping machine comprising a mechanism embodying rotary means to feed paper under a marking instrument; a transmission mechanism operatively connecting the said rotary means and a wheel of the vehicle carrying said machine, embodying an engaged friction wheel and friction disk transmission; a cam rotatively mounted in supporting relation to said friction wheel; a radial member fixedly connected with said cam; and a body of mercury arranged to rotate about the center of said radial member to support the said member.

7. An automatic mapping machine comprising a mechanism embodying rotary means to feed paper under a marking instrument; a transmission mechanism operatively connecting the said rotary means and a wheel of the vehicle carrying said machine, embodying an engaged friction wheel and friction disk transmission; a cam rotatively mounted in supporting relation to said friction wheel; a radial member fixedly connected with said cam; a cylindrical casing for said radial member; a body of mercury arranged to rotate about the center of said radial member to support the said member; and a medium of less specific gravity than mercury, mounted thereon, and supported thereby above the rotary center thereof.

8. An automatic mapping machine comprising a mechanism embodying rotary means to feed paper under a marking instrument; a transmission mechanism operatively connecting the said rotary means and a wheel of the vehicle carrying said machine, embodying an engaged friction wheel and friction disk transmission; a cam rotatively mounted in supporting relation to said friction wheel; a radial member fixedly connected with said cam; a cylindrical casing for said radial member; a body of mercury arranged to rotate about the center of said radial member to support the said member; and a medium lighter than mercury supported thereby above the rotary center thereof, and completely filling said casing to exclude any lighter medium therefrom.

9. An automatic mapping machine comprising a mechanism embodying rotary means to feed paper under a marking instrument; a transmission mechanism operatively connecting the said rotary means and a wheel of the vehicle carrying said machine, embodying an engaged friction wheel and friction disk transmission; a cam rotatively mounted in supporting relation to said friction wheel; a radial member fixedly connected with said cam; a cylindrical casing for said radial member; and a leveling device embodying two liquids of different specific gravity filling said casing and conjoined on the rotary center of said radial member.

10. An automatic mapping machine comprising a mechanism embodying rotary means to feed paper under a marking instrument; a transmission mechanism operatively connecting the said rotary means and a wheel of the vehicle carrying said machine embodying an engaged friction wheel and friction disk transmission; a cam rotatively mounted in supporting relation to said friction wheel; a float radially extended from said cam; a completely inclosed casing to receive said float; a fluid medium held within said casing and adapted to buoy said float; and a fluid medium incapable of buoying said float, completely filling the said casing and resting on said first mentioned fluid.

11. An automatic mapping machine comprising a marking instrument; a plurality of laterally disposed rotary means to feed the paper under said instrument; a transmission mechanism operatively connecting the said rotary means and a wheel of the vehicle carrying said machine and embodying two friction wheels and a friction transmission disk engaged therewith; a train of gears operatively connecting one of said rotary means and one of said friction wheels; a train of gears operatively connecting the other of said rotary means and the other of said friction wheels; and a sliding mechanism for shifting the second mentioned friction wheel radially on the said friction disk.

12. An automatic mapping machine comprising a marking instrument; a plurality of laterally disposed rotary means to feed the paper under said instrument; a transmission mechanism operatively connecting the said rotary means and a wheel of the vehicle carrying said machine and embodying two friction wheels and a friction transmission disk engaged therewith; a train of gears operatively connecting one of said rotary means and one of said friction wheels; a train of gears operatively connecting the other of said rotary means and the other of said friction wheels; a sliding mechanism for shifting the second mentioned friction wheel radially on the said friction disk; and a mechanism embodying a member fixed on the body of the vehicle and adapted to operate the said sliding mechanism.

13. An automatic mapping machine comprising a marking instrument; a plurality of laterally disposed rotary means to feed the paper under said instrument; a transmission mechanism operatively connecting the said rotary means and a wheel of the vehicle carrying said machine and embodying two friction wheels and a friction transmission disk engaged therewith; a train of gears operatively connecting one of said rotary means and one of said friction wheels; a train of gears operatively connecting the other of said rotary means and the other of said friction wheels; a sliding mechanism for shifting the second mentioned friction wheel radially on the said friction disk; a cam operatively connected with said sliding mechanism; and a driving mechanism embodying a member fixed on the body of the vehicle and adapted to operate said cam.

14. An automatic mapping machine comprising a marking instrument fixedly located on the machine; a primary feeding device to continuously advance the map paper while in contact with said marking instrument; a plurality of auxiliary feeding devices operating on opposite sides of said primary feeding device to control the movement of said paper; and means embodying the steering gear of the vehicle carrying said machine, for successively engaging each of the said auxiliary feeding devices.

15. An automatic mapping machine comprising a marking instrument fixedly located on the machine; a primary feeding device to continuously advance the map paper while in contact with said marking instrument; a plurality of auxiliary feeding devices operating on opposite sides of said primary feeding device to control the movement of said paper; a transmission mechanism operatively connected with said feeding devices and a wheel of the vehicle carrying the machine and embodying two friction wheels and a fricton disk operatively engaged therewith; a train of gears connecting one of said auxiliary feeding devices and one of said friction wheels; a train of gears connecting the other of said auxiliary feeding devices and the other of said friction wheels; a sliding mechanism for shifting the last mentioned friction wheel radially upon the said disk; and means embodying the steering gear of the vehicle for successively placing said auxiliary devices in operative engagement with said paper.

In testimony whereof I have signed my name to this specification in the presence of two subscribing witnesses.

MIGUEL BUSTAMANTE (H).

Witnesses:
GUILLERMO BUSTEMANTE,
ODÓN GOMER.